W. H. EXLEY & W. T. FIELD.
STEERING APPARATUS FOR AUTOMOBILES AND THE LIKE.
APPLICATION FILED MAY 15, 1915.
1,158,469.                                        Patented Nov. 2, 1915.
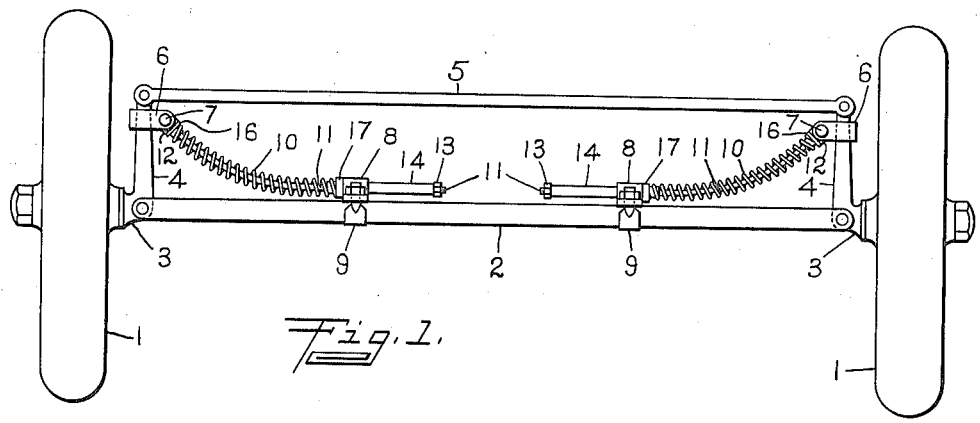
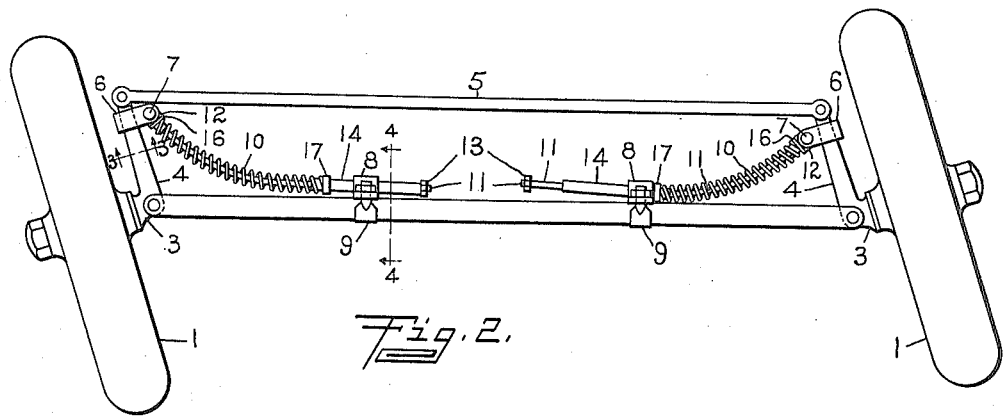
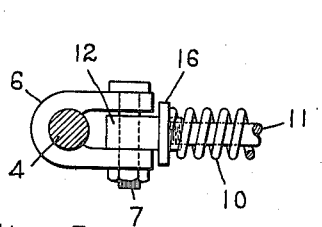
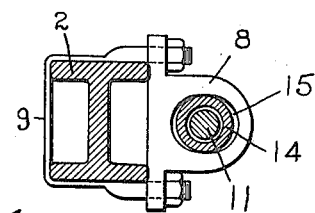
Witness
A. W. Jamieson
Inventors
William H. Exley and
William T. Field
By Willard Eddy
Attorney

UNITED STATES PATENT OFFICE.

WILLIAM H. EXLEY AND WILLIAM T. FIELD, OF LINCOLN, NEBRASKA.

STEERING APPARATUS FOR AUTOMOBILES AND THE LIKE.

1,158,469.  Specification of Letters Patent.  Patented Nov. 2, 1915.

Application filed May 15, 1915. Serial No. 28,275.

*To all whom it may concern:*

Be it known that we, WILLIAM H. EXLEY and WILLIAM T. FIELD, citizens of the United States, residing in the city of Lincoln, in the county of Lancaster and State of Nebraska, have invented certain new and useful Improvements in Steering Apparatus for Automobiles and the like, and have described the same in the following specification, illustrated by the accompanying drawings.

The invention relates to that class of steering apparatus for automobiles and similar vehicles, which comprises steering knuckles carried by an axle and adapted to direct the wheels of that axle, and a drag link connecting the knuckles.

It is the main object of the invention to prevent these wheels from being steered sidewise by accident, as when one of them strikes an obstacle in the road; to return the wheels automatically to a normal straight course, when they are unintentionally deflected therefrom; to render the steering easy for the driver, especially when the vehicle is running in a straight course; to impart to the apparatus a continual propensity to steer the vehicle straight; and in general to stabilize the action of steering apparatus of the specified class.

To accomplish this result, we incorporate in our improved steering apparatus, as parts thereof, a yielding connection between the front axle of the vehicle and the steering knuckles respectively.

In the accompanying drawings, illustrating the best manner in which we have contemplated applying the principles of the invention, Figure 1 is a plan of the front wheels and axle of an automobile which is provided with steering apparatus constructed in accordance with these principles and positioned for steering straight ahead. Fig. 2 is a plan of the same, showing the apparatus as positioned when the wheels are diverted from a straight course. Fig. 3 is a vertical section on the line 3—3 of Fig. 2. Fig. 4 is a vertical section on the section line 4—4 of Fig. 2.

In the illustrated construction, the wheels 1 are hinged to the opposite ends of the axle 2 by the steering knuckles 3, having the fingers, or short steering arms, 4, which are mutually connected by the drag link 5, all in the usual manner. On each of these fingers, near its outer end, is clamped the bracket 6, whose separated cheeks are interconnected by the clamping hinge bolt 7; while on the axle 2, at equal distances from its opposite ends, are set the spaced brackets 8, which are clamped to the axle by the screw clips 9. Between each bracket 8 and the near bracket 6 is inserted the open cylindrical spring 10, which contains a portion of the directing rod 11, and bends conformably thereto. One end of this rod has an eye 12 for the accommodation of the bolt 7, and is hinged thereby to the bracket 6; the other end of the same is provided with a stop nut 13; while a straight portion of the same, together with the loose and slidable sleeve 14 thereon, extends loosely through the slot 15 in the bracket 8. The spring on this rod, is in each instance confined under variable compression, between the shoulder 16 and the shoulder 17 forming the continguous end of the stop sleeve 14. While the wheels run straight, as in Fig. 1, that compression is equal in both springs, and the resulting pressure against the shoulders 17 pushes the sleeves 14 endwise on the rods 11 against the stop nuts 13, and produces no steering effect. But whenever the wheels are turned aside, as in Fig. 2, one of the rods 11 is pushed slidingly endwise in its sleeve 14, the latter being stopped by the contact of the shoulder 17 with the bracket 8, with the result that the encircling spring 10 is subjected to additional compression between the shoulders 16 and 17, and immediately exerts its entire accumulated energy in the effort to push farther apart the brackets adjacent to these shoulders, and thereby to return the wheels to the straight-running position by means of the linked steering knuckles; while the other rod 11, with its sleeve 14 is pulled longitudinally in the opposite direction, in the slotted bracket 8, without affecting either the compression of its encircling spring or the steering of the vehicle. Accordingly the directing energy exerted by the acting spring when the wheels are deflected from a straight course, is approximately proportioned to the extent of their deflection, and operatively varies therewith as the deflection changes.

We claim as our invention—

1. In a vehicle having an axle and steering knuckles carried thereby, a steering apparatus comprising a pair of pushrods flexibly joined to the steering knuckles respectively, a pair of slotted brackets secured to the axle, a pair of sleeves slidable on the pushrods in the brackets, and yielding connections between the knuckles and the sleeves.

2. Steering apparatus of the specified class, comprising an axle, steering knuckles hinged to the axle and linked together, a pair of brackets carried by the knuckles respectively, a pair of spaced brackets carried by the axle, and a yielding connection between each axle bracket and one of the knuckle brackets; said connection comprising a rod terminally hinged to one of the connected brackets and reciprocable in a slot through the other of said brackets, a spring encircling the rod, and a sleeve slidable on the rod through the slot.

3. Steering apparatus of the specified class, comprising an axle, steering knuckles hinged to the axle and having fingers linked together, a pair of brackets carried by the knuckle fingers respectively, a pair of slotted brackets carried by the axle, and a yielding connection between each knuckle bracket and one of the slotted brackets; said connection comprising a rod flexibly joined to the knuckle bracket, a sleeve slidable on the rod in the slotted bracket, and an open helical spring working on the rod and between the brackets.

4. Steering apparatus of the specified class, comprising an axle, steering knuckles carried by the axle and linked together, a rod hinged to each of the steering knuckles, a slidable sleeve on the rod, a helical spring encircling the rod and confined between the hinge and the sleeve, and a bracket fastened on the axle and loosely encircling the sleeve.

Witness our signatures at Lincoln, Nebraska, May 10, 1915.

WILLIAM H. EXLEY.
WILLIAM T. FIELD.